(12) United States Patent
Ye

(10) Patent No.: US 12,467,498 B2
(45) Date of Patent: Nov. 11, 2025

(54) SINGLE RING TYPE LOCKNUT ASSEMBLY

(71) Applicant: Chunlin Ye, Zhejiang (CN)

(72) Inventor: Chunlin Ye, Zhejiang (CN)

(*) Notice: Subject to any disclaimer, the term of this patent is extended or adjusted under 35 U.S.C. 154(b) by 146 days.

(21) Appl. No.: 18/178,939

(22) Filed: Mar. 6, 2023

(65) Prior Publication Data

US 2023/0204066 A1 Jun. 29, 2023

Related U.S. Application Data

(63) Continuation-in-part of application No. PCT/CN2021/116571, filed on Sep. 4, 2021.

(30) Foreign Application Priority Data

Sep. 6, 2020 (CN) .......................... 202010925087.9

(51) Int. Cl.
*F16B 39/18* (2006.01)
*F16B 39/30* (2006.01)
*F16B 39/36* (2006.01)

(52) U.S. Cl.
CPC .............. *F16B 39/30* (2013.01); *F16B 39/36* (2013.01)

(58) Field of Classification Search
CPC ............................. F16B 39/128; F16B 39/36
USPC .................................. 411/226, 237, 238, 241
See application file for complete search history.

(56) References Cited

U.S. PATENT DOCUMENTS

| | | | | |
|---|---|---|---|---|
| 898,432 | A | * 9/1908 | Boyle | F16B 39/36 411/931 |
| 1,157,596 | A | * 10/1915 | Sherman | F16B 39/36 411/269 |
| 1,372,525 | A | * 3/1921 | Mccabe | F16B 39/36 411/266 |

(Continued)

FOREIGN PATENT DOCUMENTS

| | | |
|---|---|---|
| CN | 105626660 A | 6/2016 |
| CN | 105937538 A | 9/2016 |

(Continued)

OTHER PUBLICATIONS

International Search Report of PCT/CN2021/116571.

(Continued)

*Primary Examiner* — Flemming Saether
(74) *Attorney, Agent, or Firm* — Tutunjian & Bitetto, P.C.

(57) ABSTRACT

Disclosed is a ring type locknut, where a frustum-shaped internal thread concave cavity is arranged on a nut, inside which an annular member with frustum-shaped internal and external threads matching the concave cavity nut is provided, an eccentric value based on a specification thread fit clearance is set between internal threads and external threads of the annular member, so that when the annular member is screwed into a bolt together with the nut for locking, the expected objective that the nut will not loosen by only locking a single structure is achieved thanks to a comprehensive effect of the formed original nut structure, the eccentricity of the annular member and the structure of multiple properties of the tapered thread; the single-structure nut is used in a superposed mode, or the annular member is arranged on another nut, so that the overall anti-loosening effect is improved by the double-nut structure.

2 Claims, 3 Drawing Sheets

(56) References Cited

U.S. PATENT DOCUMENTS

| | | | | |
|---|---|---|---|---|
| 1,524,099 | A | * | 1/1925 | Morehead ............... F16B 39/36 411/269 |
| 1,609,563 | A | * | 12/1926 | Loy ......................... F16B 39/36 411/270 |
| 2,621,697 | A | * | 12/1952 | Mcpherson ............. F16B 39/36 411/935 |
| 5,154,560 | A | * | 10/1992 | Copito .................... F16B 39/12 411/266 |
| 5,447,398 | A | * | 9/1995 | Chiang ................... F16B 39/18 411/269 |
| 5,855,463 | A | * | 1/1999 | Newby .................... F16B 39/18 411/932 |
| 6,000,875 | A | | 12/1999 | Staniszewski |
| 2022/0412393 | A1 | * | 12/2022 | Tokumoto ............... F16B 39/36 |

FOREIGN PATENT DOCUMENTS

| CN | 110425213 A | 11/2019 |
|---|---|---|
| CN | 111365352 A | 7/2020 |
| CN | 111963551 A | 11/2020 |
| CN | 112032177 A | 12/2020 |

OTHER PUBLICATIONS

The American Society of Mechanical Engineers, Unified Inch Screw Threads (UN and UNR Thread Form), An American National Standard, Sep. 30, 2004, pp. 1-190, ASMEB1.1-2003 Revision of Asme B1.1-1989 (R2001).

German Institute for Standardisation, General purpose ISO metric screw threads Part 25: Limits of sizes for fine pitch threads with preferred tolerance classes—Nominal thread diameters of 182 mm to 250 mm, Aug. 2005, pp. 1-16, vol. ICS 21.040.10.

International Organization for Standardization, ISO general purpose metric screw threads—Tolerances—Part 1: Principles and basic data, Sep. 15, 2013, pp. 1-35, 4th Edition. ISO 965-1:2013(E), Published in Switzerland.

* cited by examiner

SINGLE RING TYPE LOCKNUT ASSEMBLY

TECHNICAL FIELD

The present invention relates to the field of loosening prevention in common use of bolts and nuts, and particularly relates to a single ring type locknut assembly.

BACKGROUND ART

Currently, it is known that in people's daily life and work, the application of various bolts and nuts can be seen everywhere. Bolts and nuts are the most commonly used and the most common solid parts in various devices. Screws are also known as the rice of industry, although they are seemingly tiny, their actual functions are by no means small, especially on some important occasions involving safety, including a variety of high-tech objects, the reliability of bolts and nuts cannot be ignored. Loosening or falling may cause fatal damage to the equipment. Therefore, how to reliably and effectively prevent bolts and nuts from loosening is a specific problem that we often need to face seriously. Ready-to-use products and existing technical solutions are not exactly few, but due to great differences in demand in different application occasions, various existing lockbolts and locknuts and technical solutions have their respective advantages. An online comment about Japanese Hardlock nuts says "advanced manufacturing, no matter whether the rocket, aircraft, automobile or rail transit, must a foundation for "advanced", that is, spare parts must be advanced, and cannot be a hindrance to the manufacturing development. Locknuts are the most inconspicuous parts, but they are indispensable for a variety of machines and equipment. However, the more fundamental and indispensable areas, the greater gap between China and developed countries becomes", which also prompts everyone to work hard to continuously enrich and improve some highly reliable and greatly universal locknut technical solutions. Hardlock nuts are of double-nut anti-loosening structure. In reality, they are often limited by the position of usage space, and a single nut also has anti-loosening demand.

SUMMARY

In order to solve the defects in loosening prevention of nuts in the prior art, the present invention provides a type locknut that is reasonable, reliable, easy to operate, greatly universal, and suitable for single and double nut structures.

In order to achieve the above objective, the present invention is mainly solved by the following technical solution: a single ring type locknut assembly is characterized in that the assembly includes a nut provided with a frustum-shaped internal thread concave cavity and an outer frustum-shaped annular member arranged therein, an eccentric value based on eliminating a specification thread fit clearance of a standard specification size of the nut is set between internal threads and external threads of the annular member, the eccentric value is a clearance existing when the internal thread of the nut is matched with a bolt, and the fit clearance between the frustum-shaped internal thread of the nut and the tapered external thread of the annular member is also considered, so that when the annular member is screwed into a bolt together with the nut for locking, the expected objective that the nut will not loosen by only locking a single structure is achieved thanks to a comprehensive structural effect of the formed and retained original nut structure, the eccentricity of the annular member and the structure of multiple properties of the tapered thread;

further, the above single-structure nut is used in a superposed mode, or the annular member of the above single-structure is arranged on another nut, so that the overall anti-loosening effect is improved by the double-nut structure.

The frustum-shaped internal thread concave cavity and the taper of the annular member matched with the frustum-shaped internal and external thread concave cavity is selected in a way that can meet progressive locking structure conditions of the tapered thread; the tapered thread structure can be arranged into a progressive cam structure which is distributed in an intermittent annular manner according to different sizes and application occasions of the nut; and the specification thread refers to the standard specification size of a specific nut.

Preferably, the locking surface of the single-structure nut or the matching double nut can be set to be in a one-way retaining anti-loosening structure shape, so that the anti-loosening effect of the nut is improved.

Preferably, an annular elastic retaining anti-loosening washer that matches with the one-way retaining anti-loosening structure is additionally arranged below the nut provided with a one-way retaining anti-loosening structure, so that the anti-loosening effect of the nut is further improved more reliably.

Preferably, the nut can be designed into a special specification by increasing the overall structural size, so that the anti-loosening effect of the nut is further improved more reliably.

The present invention grasps key points of solving the problems, makes better use of the features that the nut plays a role mainly on the first and second teeth of the locking surface in a reasonable, simple, reliable and feasible structural form, the single-structure nut is equivalent to introducing a combined locking setting of a tapered thread and an eccentric structure on the premise that the original lock effect of the nut is retained, and the annular member and the outer nut are synchronously locked with each other, so that it can be carried and stored in an integrated manner without additional working procedures, thereby guaranteeing convenient use and reliable anti-loosening effect. Since all functional and effective structures are on the same nut, it cannot cause substantial damage to the bolt due to the characteristic of the tapered thread and the torsion of an ultra-small part. What is more rare is that the present invention can not only achieve practical effects on the basis of the specifications and size of a standard part, thus providing a better selection for application occasions, limited use space and the like, and the actual effect can also be improved by increasing the overall structure design size. Under the condition that the present invention adopts a double-nut structure, no matter a superposition form or a form with slight variation is selected, it equivalent to having the effect of making each have four sections and being capable of staggering the force positions or a three-section multiple combination locking structure, which fully embodies the structural features of the present invention and active flexibility in solving the technical problem, proving a reasonable and compact structural arrangement to achieve the expected anti-loosening effect.

The present invention has the beneficial effects as follows: by identifying an effective methods for solving problems and grasping essential points of solving problems, practical and reliable effects that the nut will not loosen after being locked are achieved with reasonable and simple structural features and easy implementation thereof by combining the tapered thread and the eccentric structure with the locking bolt that is complementary to each other from various aspects.

DETAILED DESCRIPTION OF THE EMBODIMENTS

A ring type locknut is further described below in conjunction with the schematic diagram.

Figure 1:
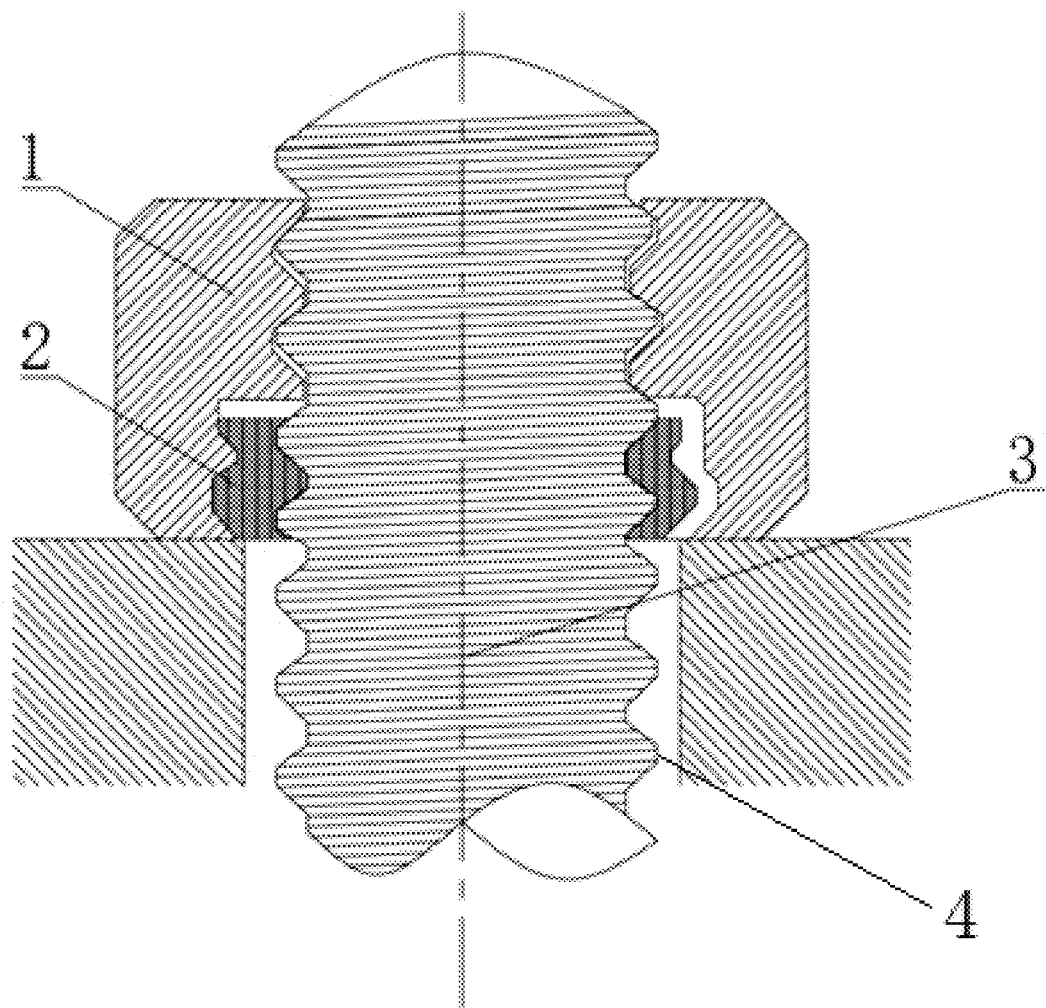
FIG. 1 is a schematic diagram of a single structure of a ring type locknut of the present invention.
In the figure: 1. concave cavity nut; 2. frustum-shaped annular member; 3. Bolt; and 4. second external thread.
Figure 3:
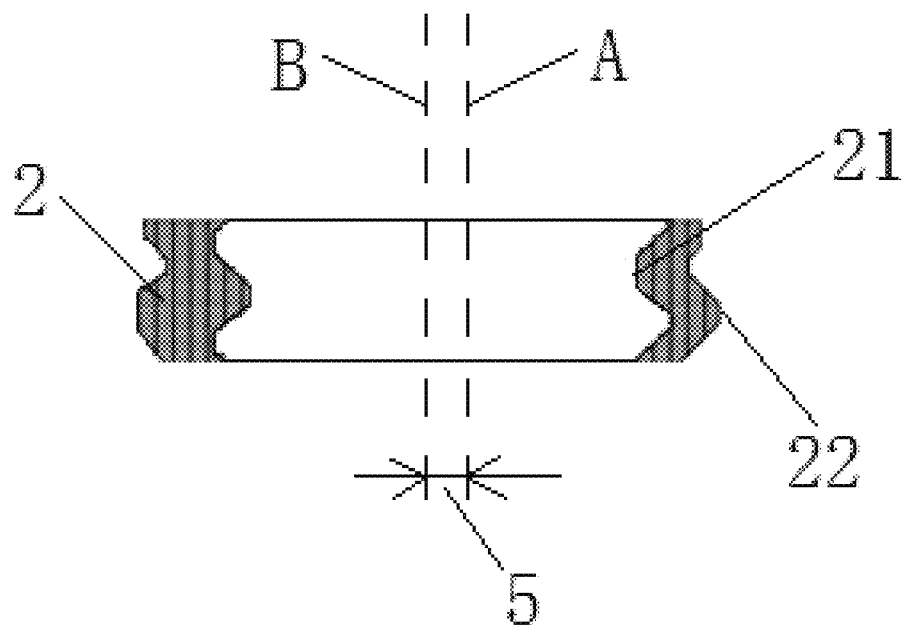
FIG. 3 is a schematic diagram of a frustum-shaped annular member in FIG. 1 of the present invention.
In the figure: 21. third internal thread; 22. first external thread; 5. eccentric value; A. first central axis of third internal thread; and B. second central axis of first external thread.
Figure 4:
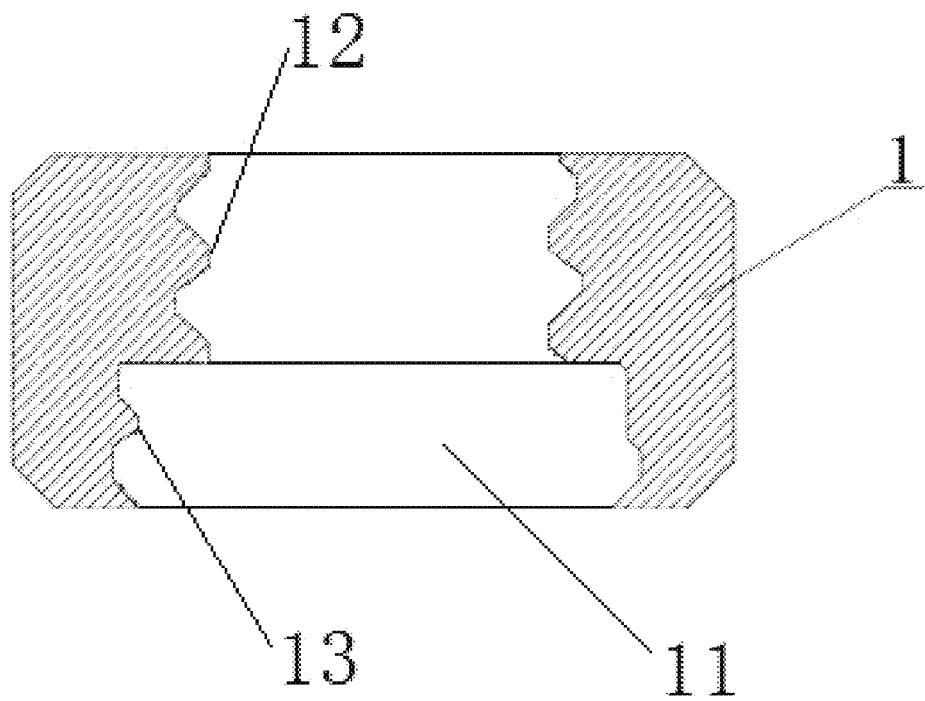
FIG. 4 is a schematic diagram of a concave cavity nut in FIG. 1 of the present invention.
In the figure: 11. frustum-shaped concave cavity; 12. first internal thread; and 13. second internal thread.

Embodiment 1: a single structure of a ring type locknut as shown in FIG. 1, where a frustum-shaped concave cavity 11 with second internal threads 13 (see FIG. 4) is arranged in a nut with first internal threads 12 to form an overall concave cavity nut 1, a frustum-shaped annular member 2 with third internal threads 21 and first external threads 22 matching the concave cavity nut 1 is arranged inside the frustum-shaped concave cavity 11 thereof, the taper of each of the first internal thread 12, the second internal thread 13, the third internal thread 21 and the first external thread 22 is set to be 3 degrees, an eccentric value 5 is set between a first central axis A of the third internal threads 21 and a second central axis B of the first external threads 22 of the frustum-shaped annular member 2 based on eliminating a specification thread fit clearance between the first internal threads 12 and the second external threads 4 of a bolt 3 configured for mating with the first internal threads 12 and the third internal threads 21, a specification thread fit clearance between the third internal threads 21 and the second external threads 4, and a fit clearance between the second internal threads 13 and the first external threads 22 of the frustum-shaped annular member 2 (see FIG. 3) so that when the frustum-shaped annular member 2 is screwed into the bolt 3 together with the nut for locking, the expected objective that the nut will not loosen by only locking a single structure is achieved thanks to a comprehensive structural effect of the formed and retained original nut structure, the eccentricity of the frustum-shaped annular member 2 and the structure of multiple properties of the tapered threads; main guiding idea of the present invention is to solve the technical problem when a single standard specification nut is limited in application occasions but is subjected to anti-loosening reliability requirements; more obviously, structural features of the present invention can be apparently designed as non-standard ones by increasing the size according to actual needs, and the present invention can adopt a double nut structure used in a superposed mode to enhance the overall anti-loosening effect after the nut is locked; since the present invention features the thread structure, the overall structural function effect is realized in the same nut, the eccentric value 5 of the frustum-shaped annular member 2 cannot cause substantial damage to the bolt 3 due to the comprehensive stress relation, moreover, under the condition that the present invention uses a double-nut structure for anti-loosening, a four-section locking structure capable of staggering the force positions is actually formed, and compared with a common double-nut anti-loosening structure, it has more prominent structural and functional advantages. In the present implementation, the tapered thread internally arranged in the concave cavity nut 1 may be changed, in the same way as needed, into that in a tapered concave cavity or a circular concave cavity that matches with the eccentricity of an external non-thread of the frustum-shaped annular member 2, so as to realize the functions.

Figure 2:
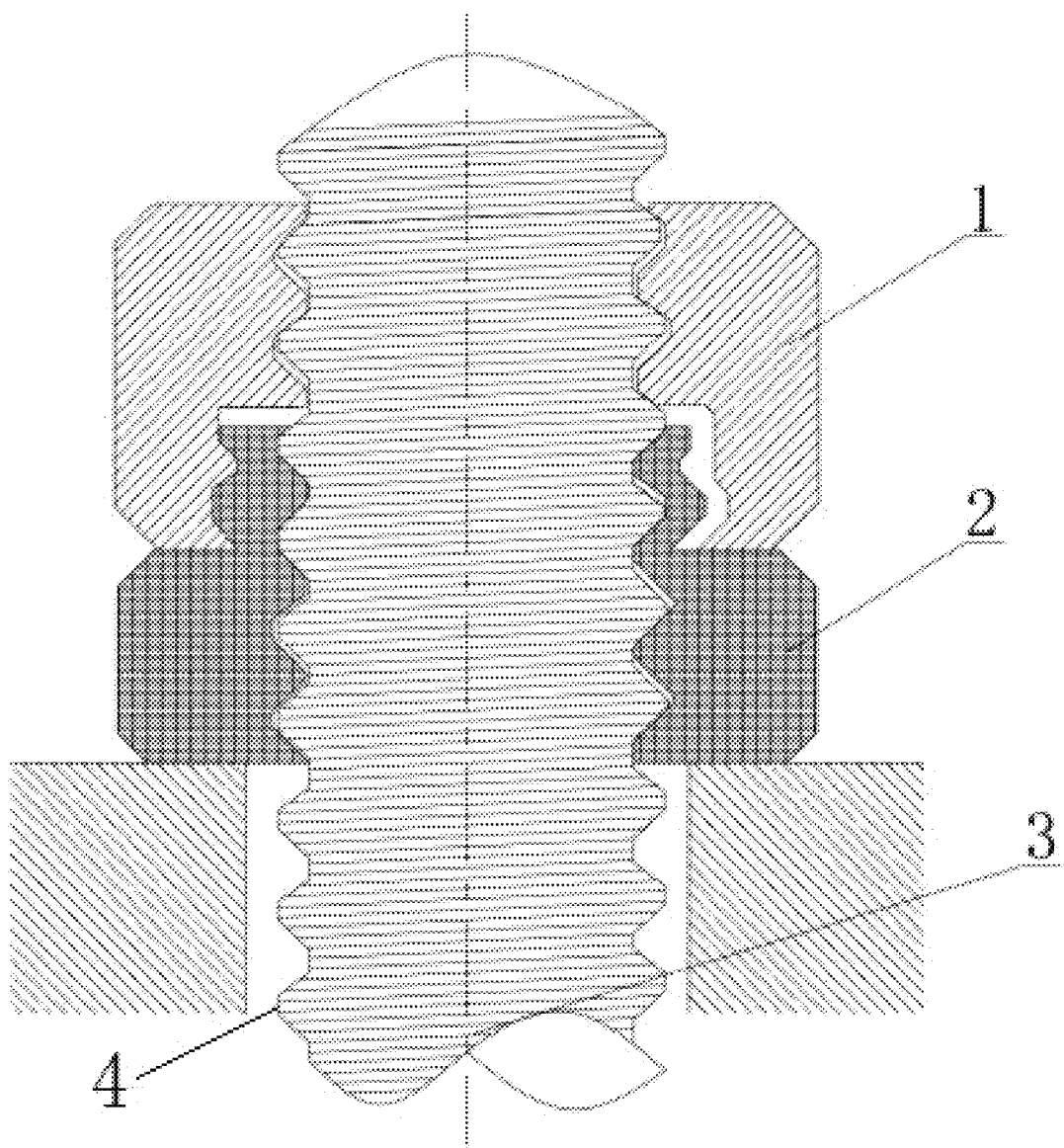
FIG. 2 is a schematic diagram of a ring type locknut with slight change in the structure of the present invention.
In the figure: 1. concave cavity nut; 2. boss nut; 3. Bolt; 4. Second external thread.

Embodiment 2: a ring type locknut with slight change in the structure as shown in FIG. 2, which is actually designed according to the specification and size of a standard nut, moreover, the structural features of the concave cavity nut 1 in the present invention are the same as those of Embodiment 1, but the frustum-shaped annular member in Embodiment 1 is added to another nut, thereby forming a boss nut 2, both structural and functional effects of the double nuts in the specific embodiment are slightly different from those of Embodiment 1, but they have their respective advantages, the overall structure and effect are also worthy of recognition, which may be suitable for different needs, under the condition that the present embodiment aims to enhance actual effect, it is apparently designed as non-standard ones by increasing the size according to actual needs.

Apparently, those skilled in the art may make various modifications and variations to the structural arrangement of the present invention without departing from the spirit and scope of the present invention. Therefore, if these modifications fall within the technical scope of the claims of the present invention and their equivalents, the present invention is also intended to include these modifications.

What is claimed is:

1. A single ring type locknut assembly, wherein the assembly in its installed state mates with a bolt, the assembly comprising:
   a nut with first internal threads, the nut provided with a frustum-shaped concave cavity with second internal threads;
   a frustum-shaped annular member provided with third internal threads and first external threads, the frustum-shaped annular member being arranged inside the frustum-shaped concave cavity;
   wherein an eccentric value is set between a first central axis of each of the third internal threads and a second central axis of each of the first external threads for eliminating a thread clearance between the first internal threads and second external threads of the bolt, a thread clearances between the second external threads and the third internal threads, and a thread clearance between the second internal threads and the first external threads, and the second external threads of the bolt are configured for mating with the first internal threads and the third internal threads and the eccentric value is greater than zero;
   each of the first internal threads, the second internal threads, the third internal threads, the first external threads and the second external threads is a standard thread.

2. The single ring type locknut assembly according to claim 1, wherein the nut is able to be designed into a special specification by increasing overall structural size of the assembly.

* * * * *